(12) United States Patent
Liu et al.

(10) Patent No.: US 10,458,030 B2
(45) Date of Patent: Oct. 29, 2019

(54) ION EXCHANGE MEMBRANE ELECTROLYTIC CELL

(71) Applicant: Bluestar (Beijing) Chemical Machinery Co., LTD., Beijing (CN)

(72) Inventors: Xiuming Liu, Beijing (CN); Jianzhong Kang, Beijing (CN); Lirui Zhang, Beijing (CN); Weihong Wang, Beijing (CN); Xiaofeng Qiao, Beijing (CN); Junfeng Zhang, Beijing (CN); Xuehua Wu, Beijing (CN)

(73) Assignee: BLUESTAR (BEIJING) CHEMICAL MACHINERY CO., LTD. (CN)

( * ) Notice: Subject to any disclaimer, the term of this patent is extended or adjusted under 35 U.S.C. 154(b) by 57 days.

(21) Appl. No.: 15/116,751

(22) PCT Filed: Dec. 3, 2014

(86) PCT No.: PCT/CN2014/092883
§ 371 (c)(1),
(2) Date: Aug. 4, 2016

(87) PCT Pub. No.: WO2016/086364
PCT Pub. Date: Jun. 9, 2016

(65) Prior Publication Data
US 2017/0306513 A1    Oct. 26, 2017

(51) Int. Cl.
*C25B 9/18*    (2006.01)
*C25B 9/00*    (2006.01)
(Continued)

(52) U.S. Cl.
CPC .......... *C25B 15/08* (2013.01); *B01D 19/0031* (2013.01); *C25B 1/46* (2013.01); *C25B 9/08* (2013.01)

(58) Field of Classification Search
CPC .. C25B 9/18; C25B 9/00; C25B 15/00; C25D 17/00; C25D 17/002
(Continued)

(56) References Cited

U.S. PATENT DOCUMENTS

2007/0235338 A1* 10/2007 Kodama .................. C25B 9/08
204/627

FOREIGN PATENT DOCUMENTS

CN       1407137     4/2003
CN     201080501     7/2008
(Continued)

*Primary Examiner* — Zulmariam Mendez
(74) *Attorney, Agent, or Firm* — Colin P. Cahoon; Samie S. Leigh; Carstens & Cahoon, LLP

(57) ABSTRACT

Disclosed is an ion exchange membrane electrolytic cell, comprising an anode chamber and a cathode chamber; a gas-liquid separation chamber is arranged in the anode chamber and/or the cathode chamber; the gas-liquid separation chamber is partially located inside the anode chamber and/or the cathode chamber; a first portion of the gas-liquid separation chamber, which is configured to accommodate liquid, is arranged inside the anode chamber and/or the cathode chamber; and a second portion of the gas-liquid separation chamber, which is configured to accommodate gas, is disposed outside of the anode chamber and/or the cathode chamber. The ion exchange membrane electrolytic cell is provided with the gas-liquid separation chamber partially located inside the anode chamber and/or the cathode chamber, thereby improving the yield of the ion exchange membrane electrolytic cell. On the other hand, the products of electrolysis can be drained rapidly.

11 Claims, 8 Drawing Sheets

(51) Int. Cl.
*C25D 17/00* (2006.01)
*C25B 15/08* (2006.01)
*C25B 1/46* (2006.01)
*C25B 9/08* (2006.01)
*B01D 19/00* (2006.01)

(58) Field of Classification Search
USPC .......................................................... 204/257
See application file for complete search history.

(56) References Cited

FOREIGN PATENT DOCUMENTS

| | | |
|---|---|---|
| CN | 101451245 | 6/2009 |
| CN | 203653710 | 6/2014 |
| CN | 203700535 | 7/2014 |
| JP | H1171693 | 3/1999 |

* cited by examiner

ION EXCHANGE MEMBRANE ELECTROLYTIC CELL

CROSS REFERENCE TO RELATED APPLICATIONS

This application is a continuation application of PCT Patent Application No. PCT/CN2014/092883, entitled "Ion Exchange Membrane Electrolytic Cell", filed on Dec. 3, 2014, the entire contents of which are incorporated herein by reference.

TECHNICAL FIELD

The invention relates to chlor-alkali chemical industry equipment, and more especially, to a novel ion exchange membrane electrolytic cell suitable for higher current densities.

TECHNICAL BACKGROUND

As is well known, an ion exchange membrane electrolytic cell is the equipment for producing sodium hydroxide, chlorine and hydrogen through electrolyzing the brine solution.

In recent years, the electrolytic cell is developing toward higher current density and larger scale, enabling the electrolytic cell to produce more and more chlorine, hydrogen and sodium hydroxide through electrolyzing, but the products of electrolysis cannot be drained away promptly such that greater pressure fluctuation is generated in the cathode chamber and the anode chamber of the ion exchange membrane electrolytic cell, and that the pressure on the ion exchange membrane is increased, thereby affecting the service life of the ion exchange membrane. Since the products of chlorine, hydrogen and sodium hydroxide cannot be drained off from the anode chamber and/or the cathode chamber promptly, they will prevent further generation of products of electrolysis, and thereby restricting the increase of the productivity of a single high-current-density electrolytic cell.

Therefore, it is necessary to improve the structure of the existing ion exchange membrane electrolytic cell so as to satisfy constantly increasing requirements.

SUMMARY

In view of the above-mentioned problems, the present invention aims to provide a novel ion exchange membrane electrolytic cell, which reasonably arranges the location of the gas-liquid separation chamber so as to fully utilize the area of the ion exchange membrane during electrolysis to further improve the yield of sodium hydroxide.

The technical schemes of the present invention are as follows:

An ion exchange membrane electrolytic cell comprises an anode chamber and a cathode chamber, wherein a gas-liquid separation chamber is disposed in the anode chamber and/or the cathode chamber, said gas-liquid separation chamber is partially located inside said anode chamber and/or said cathode chamber; wherein a first portion of said gas-liquid separation chamber, which is configured to accommodate liquid, is disposed inside said anode chamber and/or said cathode chamber, and a second portion of said gas-liquid separation chamber, which is configured to accommodate gas, is disposed outside of said anode chamber and/or said cathode chamber.

In one of the embodiments, an inlet of said gas-liquid separation chamber is disposed outside of said anode chamber and/or said cathode chamber.

In one of the embodiments, said gas-liquid separation chamber includes a top wall, a bottom wall, a side wall and a flat plate;

a gas-liquid channel is formed between said flat plate and said side wall;

said top wall is disposed outside of said anode chamber and/or said cathode chamber, and said top wall is connected to a base plate of said anode chamber and/or said cathode chamber; and said bottom wall is disposed inside said anode chamber and/or said cathode chamber; and said bottom wall is connected to a bottom end of said side wall.

In one of the embodiments, a top end of said side wall is higher than a bottom end of said flat plate.

In one of the embodiments, an inlet of said gas-liquid separation chamber is provided with a grid structure, one end of said grid structure is connected to said top wall.

In one of the embodiments, an angle formed between said bottom wall and said side wall of said gas-liquid separation chamber is larger than 90°.

In one of the embodiments, the bottom end of said flat plate has a chamfer at a side close to the side wall.

In one of the embodiments, said ion exchange membrane electrolytic cell further includes circulation channels disposed inside said anode chamber and/or the cathode chamber.

In one of the embodiments, at least one circulation channel communicates with said gas-liquid separation chamber.

In one of the embodiments, said circulation channel is formed by one or more circulation plates or special-shaped plates, which are provided on a base plate of said anode chamber and/or said cathode chamber, and the base plate of said anode chamber and/or said cathode chamber;

or said circulation channel is formed by one or more circulating tubes, which are vertically arranged on a base plate of said anode chamber and/or said cathode chamber.

In one of the embodiments, a distance between said circulation channel and a distribution pipe of said anode chamber and/or said cathode chamber is ranged from −50 mm to +50 mm.

In one of the embodiments, said circulation plates or special-shaped plates are further provided with circulation modules.

In one of the embodiments, a spoiler is further provided in said anode chamber and/or said cathode chamber; said spoiler has a bottom end and a top end; a length of said spoiler is equal to or larger than 15 mm, and a distance from the top end of said spoiler to an anode grid or a cathode grid is equal to or larger than 5 mm.

In one of the embodiments, a circulation plate is further provided in said anode chamber and/or said cathode chamber; the circulation plate is arranged aslant, and a bottom end of said circulation plate is close to a base plate of said anode chamber or said cathode chamber.

The advantageous effects of the present invention are as follows:

In the ion exchange membrane electrolytic cell of the present invention, the gas-liquid separation chamber is located partially inside the anode chamber and/or the cathode chamber, and the gas-liquid channel is raised to the top of the gas-liquid separation chamber, such that the area of the ion exchange membrane and the area of the cathode grid and the anode grid are utilized sufficiently, that is to say, the electrolysis areas of the cathode pole and the anode pole are increased, thereby improving the yield of the ion exchange membrane electrolytic cell; on the other hand, the products of electrolysis can be drained rapidly.

DETAILED DESCRIPTION OF DISCLOSED EMBODIMENTS

In order to make the objectives, the technical schemes and the advantages of the ion exchange membrane electrolytic cell of the present invention more apparent, the present disclosure will be described in more details with reference to the accompanying figures and embodiments.

It should be noted that various embodiments and the features thereof can be combined with each other under the condition of no conflict.

Figure 1:
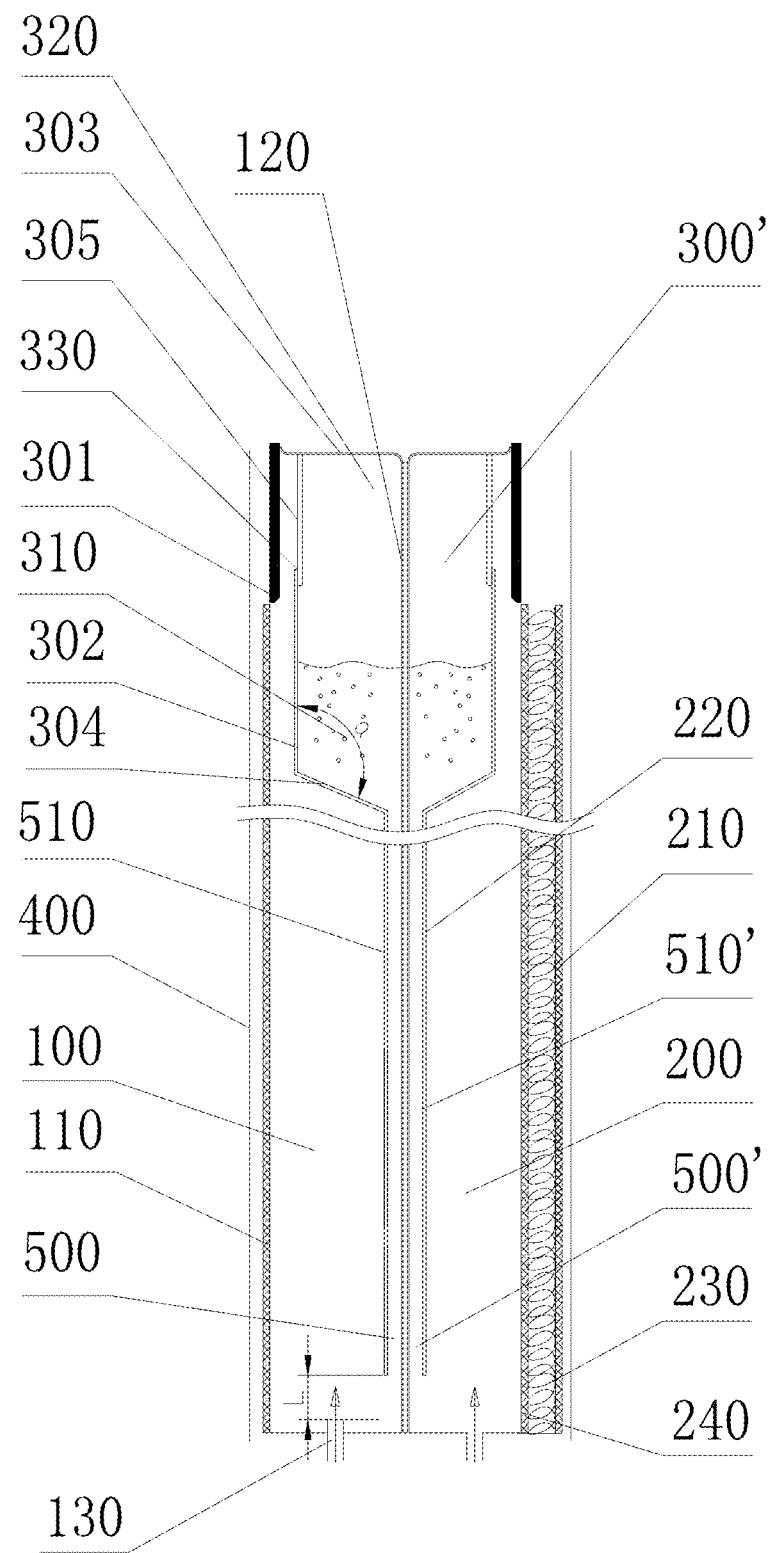
FIG. 1 is an overall schematic view of the ion exchange membrane electrolytic cell according to one embodiment of the present invention.

As shown in FIG. 1, the ion exchange membrane electrolytic cell of the present invention includes an anode chamber 100, a cathode chamber 200 and ion exchange membrane 400, wherein, the anode chamber 100 includes an anode grid 110 (the anode pole) and an anode base plate 120, and the cathode chamber 200 includes a cathode grid 210 (the cathode pole) and a cathode base plate 220. Both the anode grid 110 and the cathode grid 210 are arranged closely to the ion exchange membrane 400, and the anode base plate 120 and the cathode base plate 220 are connected in a back-to-back manner. The anode chamber 100 is provided with a concentrated-brine inlet, a diluted-brine outlet and a chlorine outlet. The cathode chamber 200 is provided with a diluted-alkaline water inlet, a concentrated-alkaline water outlet and a hydrogen outlet. In this embodiment, a gas-liquid separation chamber 300 is located partially inside the anode chamber 100 and/or the cathode chamber 200. That is to say, part of the gas-liquid separation chamber 300 is located inside the anode chamber 100 and/or the cathode chamber 200, wherein a first portion of the gas-liquid separation chamber 300, which is configured to accommodate liquid, is located inside the anode chamber 100 and/or the cathode chamber 200; a second portion of the gas-liquid separation chamber 300, which is configured to accommodate gas, is located outside the anode chamber 100 and/or the cathode chamber 200.

If the gas-liquid separation chamber is arranged outside the anode and/or cathode chambers, on one hand, part of the ion exchange membrane overlapping with the gas-liquid separation chamber is not involved in electrolysis, in other words, this part of ion exchange membrane does not work, and thus the utilization rate of the ion exchange membrane is low; on the other hand, in order to realize the same output, the volume of the electrolytic cell needs to be increased, and thus the investment and the footprint are larger. If the gas-liquid separation chamber is located totally inside the electrolysis chamber, space for gas-liquid circulation inside the electrolysis chamber is smaller and products of electrolysis cannot be drained away promptly, causing greater pressure fluctuations in the electrolysis chamber of the ion exchange membrane electrolytic cell. What's more, because the outlet for the products of electrolysis is arranged inside the electrolysis chamber, there is a larger buildup of products of electrolysis herein, which will deteriorate the operation conditions for the ion exchange membrane, and consequently affect the service life of the ion exchange membrane. Moreover, since the products above cannot be drained away from the electrolysis chamber promptly, the products will prevent further generation of products of electrolysis and thus affect the capacity of the ion exchange membrane electrolytic cell. In order to solve the above-mentioned problems, the present invention provides a solution to dispose the gas-liquid separation chamber partially inside the anode and/or cathode chambers. On one hand, the utilization rate of the ion exchange membrane can be increased and that the area of the ion exchange membrane can be utilized sufficiently during electrolysis so as to improve the output; on the other hand, the products of electrolysis can be drained away rapidly. As a preferred application, the gas-liquid separation chamber 300 is located at least partially inside the anode chamber 100.

As shown in FIG. 1, a gas-liquid separation chamber 300 is disposed at the side where the anode chamber 100 is located. After products of electrolysis in the anode chamber 100 flow into the gas-liquid separation chamber 300, the products are separated into gas and liquid. Generally, the bottom portion 310 of the gas-liquid separation chamber 300 is configured to accommodate liquid whereas the top portion 320 of the gas-liquid separation chamber 300 is configured to accommodate gas. In order to increase the utilization rate of the ion exchange member, the gas-liquid separation chamber of the present invention is located partially inside the anode chamber 100. That is to say, a part of the gas-liquid separation chamber overlaps with the anode grid 110 of the anode chamber 100, and this part of the ion exchange membrane overlapping with the gas-liquid separation chamber 300, can still work in the electrolytic cell, such that the total utilization ratio of the ion exchange membrane is increased. Similarly, another gas-liquid separation chamber 300' is partially inward disposed at the side where the cathode chamber 200 is located. It should be noted that, preferably, in this embodiment, a gas-liquid separation chamber is partially inward disposed at each of the anode chamber side and the cathode chamber side. All the technical schemes involving one gas-liquid separation chamber partially inward disposed only at the anode chamber side, or involving one gas-liquid separation chamber partially inward disposed only at the cathode chamber side, or involving gas-liquid separation chambers partially inward disposed at both of the anode chamber side and the cathode chamber side, are covered within the scope of the present invention.

In one of the embodiments, the perpendicular distance between the inlet of the gas-liquid separation chamber 300 and the upper edge of the anode chamber is equal to or larger than 5 mm. It means that the inlet of the gas-liquid separation chamber may be arranged outside the anode chamber or outside the cathode chamber, or may be arranged inside the anode chamber or inside the cathode chamber, only if the perpendicular distance is equal to or larger than 5 mm. In this way, the distance between the inlet of the gas-liquid separation chamber and the anode pole, or the distance between the inlet of the gas-liquid separation chamber and the cathode pole, can be ensured so as to enable the gas-liquid mixture to flow into the gas-liquid separation chamber smoothly.

Preferably, the inlet of the gas-liquid separation chamber 300 is arranged at the outside of the anode chamber and/or the cathode chamber. That is to say, the gas-liquid inlet 330 of the gas-liquid separation chamber 300 is positioned at the outside of the anode grid 110 of the anode chamber 100 or at the outside of the cathode grid 210 of the cathode chamber 200. In this way, the first portion 310 of the gas-liquid separation chamber 300, which is configured to accommodate liquid, is ensured to be located inside the electrolysis chamber. Consequently, the position where the gas and the liquid are separated is far away from the electrolysis portion of the anode pole or the cathode pole, enabling the gas-liquid mixture to circulate more smoothly and the products of electrolysis to drain away smoothly, and preventing the products of electrolysis from remaining in the electrolysis chamber and avoiding greater pressure fluctuations due to the gas-liquid flow direction change taking place at the inlet of the gas-liquid separation chamber. The service life of the ion exchange membrane of the present invention can be prolonged, because the service life of the ion exchange membrane would be reduced under the condition of greater pressure fluctuations.

The specific structure of the gas-liquid separation chamber of the present invention will be described by way of the example that the gas-liquid separation chamber 300 partially is located inside the anode chamber. The structure of the gas-liquid separation chamber 300' partially located inside the cathode chamber is identical to that of the gas-liquid separation chamber 300 located at the anode chamber side, and will not be described repeatedly in this embodiment.

Figure 2:
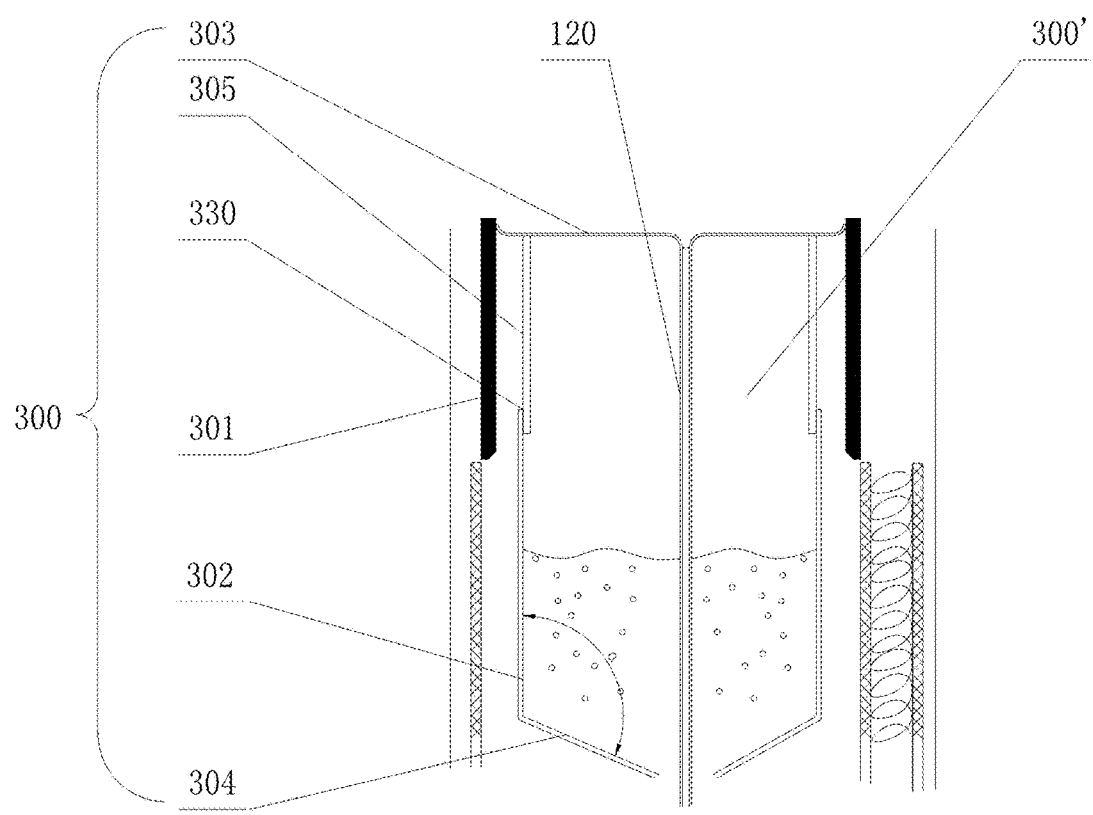
FIG. 2 is a partial enlarged view of FIG. 1.

In one of the embodiments, as shown in FIGS. 1 and 2, the gas-liquid separation chamber 300 includes a flat plate 301, a side wall 302, a top wall 303 and a bottom wall 304. A gas-liquid channel is formed between the flat plate 301 and the side wall 302. The top wall 303 is disposed outside the anode chamber 100 (that is to say, the position of the top wall 303 is higher than the position of the anode grid), and the top wall 303 is connected to the anode base plate 120. The bottom wall 304 is disposed in the anode chamber 100 and connected to the bottom end of the side wall 302. The other end of the side wall 302 is provided with the inlet 330 of the gas-liquid separation chamber 300. The flat plate 301 is connected with the anode grid 110, and the side wall 302 is partially located inside the electrolysis chamber. In this embodiment, the flat plate 301, the side wall 302, the top wall 303, the bottom wall 304 and the base plate of the electrolysis chamber are connected to form the gas-liquid separation chamber 300. As shown in FIG. 1, the top wall 303 of the gas-liquid separation chamber 300 at the anode chamber side is connected with the anode base plate 120 of the anode chamber 100. Wherein, a gas-liquid channel is formed between the flat plate 301 and the side wall 302 to allow the gas-liquid products of electrolysis to flow to the gas-liquid separation chamber 300 smoothly. In this embodiment, the positions of the top end and the bottom end are shown in FIG. 1.

Preferably, as one embodiment, the top end of the side wall 302 (i.e., the end of the side wall 302, which is near to the top wall 303) is higher than the bottom end of the flat plate 301 (i.e., the end of the flat plate 301, which is near to the bottom wall 304). In other words, in the height direction shown in FIG. 1, the top end of the side wall 302 (i.e., the end of side wall 302, which is near to the top wall 303) is higher than the top end of the anode grid 110 (i.e., the end of the anode grid 110, which is near to the top wall 303) in the anode chamber 100. With the bottom end of the flat plate lower than the top end of the side wall, the location where the gas-liquid flow direction change takes place will be far away from the anode grid, which reduces the impact to the anode grid and the ion exchange membrane caused by such as the turbulences induced by the gas-liquid flow direction change, thereby prolonging the service life of the anode grid and the ion exchange membrane. Preferably, as one embodiment, the distance between the side wall 302 and the flat plate 301 is equal to or larger than 5 mm, and the ratio of a distance between the side wall 302 and the anode grid, or a distance between the side wall 302 and the cathode grid, to the effective thickness of the anode chamber is equal to or larger than 10%. As shown in FIG. 1, the distance between the side wall 302 and the anode grid 110 of the anode chamber 100 is equal to or larger than 5 mm, preferably, the distance is from 5 to 10 mm, such that the products of electrolysis can flow into the gas-liquid separation chamber smoothly. Resistance on the gas-liquid products of electrolysis passing through the channel is larger if the distance between the side wall of the gas-liquid separation chamber and the anode grid is too small, and thus the gas-liquid mixture, which is not drained away timely, will gather at the inlet of the channel to boost the pressure within the chamber. What's more, the gas gathering at the inlet of the channel will cause the ion exchange membrane nearby rupture easily, and thus will shorten the service life of the ion exchange membrane. If the distance is too large, the gas-liquid circulation power per unit area within the channel is smaller, and thus the gas-liquid mixture cannot be smoothly introduced into the gas-liquid separation chamber.

Preferably, as one embodiment, the gas-liquid channel may be formed by one or more rectangular holes, wherein the length of a single rectangular hole is equal to or larger than 20 mm and the width thereof is equal to or larger than 5 mm.

Preferably, as one embodiment, the gas-liquid separation chamber 300 further includes a grid structure 305, one end of the grid structure 305 is connected to the top wall 303. The length of the grid structure 305 is equal to the length of the side wall 302, and the height of the grid structure 305 is smaller than the height of the overlapping portion of the side wall 302 and the outer flat plate 301. Preferably, the grid structure is a broached grid, and more preferably, the broached grid has rhombic holes, wherein the long pitch of the rhombic holes is equal to or larger than 3 mm (preferably, from 3 to 10 mm), and the short pitch of the rhombic holes is equal to or larger than 2 mm (preferably, from 2 to 7 mm). The grid structure is provided for the purpose of letting the gas, which is wrapped in large bubbles and flows into the gas-liquid separation chamber together with the liquid, escape from the liquid and flow to the top portion of the gas-liquid separation chamber. The grid structure 305 can be arranged in parallel with the side wall 302, or can be arranged at a certain angle with the side wall 302.

Preferably, as one embodiment, as shown in FIG. 1, the bottom wall 304 is tilted, and the angle α formed between the bottom wall 304 and the side wall 302 is larger than 90°, which enables the gas products of electrolysis aggregated at locations far away from the electrodes in the anode chamber and/or the cathode chamber to enter the gas-liquid separation chamber along the slope together with the rising gas-liquid flow, thereby preventing the situation that some of the gas products of electrolysis are not introduced into the gas-liquid separation chamber timely and get accumulated at the bottom wall and thus result in dead space in the chamber, which affects the electrolysis effect and shortens the service life of the ion exchange membrane.

Preferably, as one embodiment, the bottom end of the flat plate 301 has a chamfer at the side close to the side wall 302, i.e., at the side facing the inside of the anode chamber or the cathode chamber. The dip angle of the chamfer is within the range of 30° to 60°. The arrangement of the chamfer enables the gas-liquid mixture to flow into the gas-liquid separation chamber more smoothly.

Preferably, as one embodiment, the ion exchange membrane electrolytic cell further includes circulation channels 500 disposed inside the anode chamber 100 and/or the cathode chamber 200, wherein at least one circulation channel 500 communicates with the gas-liquid separation chamber 300. The circulation channels 500 communicating with the gas-liquid separation chamber 300 can introduce the diluted-brine from the gas-liquid separation chamber 300 to the bottom of the electrolytic cell under the action of gravity, so as to allow the diluted-brine to mix with the recently incoming concentrated-brine. In this embodiment, the circulation channels 500 near to the anode base plate 120 in the anode chamber 100 constitute backflow channels for the diluted-brine, and introduce the diluted-brine directly to the bottom of the cell frame, so as to prevent power loss during the diluted-brine backflow process and improve the circulation effect of the brine. This structure facilitates the vertical circulation of the electrolytic cell such that the concentration difference of the electrolyte wherever in the anode chamber is smaller and the liquid in the electrolytic cell is mixed more uniformly. Identically, circulation channels 500' are provided in the cathode chamber 200. It should be noted that the width of the circulation channel 500 is determined through calculation according to the inner circulation volume of the electrolyte with different current densities.

Taking the anode chamber as an example, the circulation channels 500 may either communicate with the gas-liquid separation chamber or not. The circulation channels communicating with the gas-liquid separation chamber introduce the diluted-brine from the gas-liquid separation chamber to the bottom of the electrolytic cell. The circulation channels not communicating with the gas-liquid separation chamber are arranged on the base plate of the electrolytic cell, so as to introduce the diluted-brine in the electrolytic cell, which is present outside the bottom wall of the gas-liquid separation chamber, to the bottom of the anode chamber.

As the electrolysis goes on, gas-liquid mixture rises continuously beyond the bottom wall of the gas-liquid separation chamber, and most gas-liquid mixture flows into the gas-liquid separation chamber to be separated and flows out of the electrolytic cell finally. Gas will flow into the gas-liquid separation chamber first due to larger buoyancy, and part of liquid, which is not discharged away timely along with the gas, will flow to the bottom of the electrolysis chamber along with the backflow of the circulating diluted-brine through the circulation channels not communicating with the gas-liquid separation chamber, which prevents the incomplete circulation of the brine. Because the circulation channels separate the gas-liquid mixture in the reaction area from the circulating diluted-brine, the negative effect by the gas-liquid mixture rising upwards from the reaction area against the downward circulation of the diluted-brine is avoided, and the circulation resistance of the diluted-brine is reduced.

In order to facilitate the gas-liquid mixture to flow in the gas-liquid separation chamber, alternatively, only the circulation channels not communicating with the gas-liquid separation chamber are provided on the base plate of the electrolytic cell.

The arrangement of the circulation channels 500' in the cathode chamber is identical to that of the circulation channels 500 in the anode chamber. Preferably, as one embodiment, the distance between the circulation plate 510 and the distribution pipe of the anode chamber or the cathode chamber, is from −50 mm to +50 mm. That is to say, as shown in FIG. 1, the distance L between the bottom end of the circulation plate 510 and the top end of the distribution pipe 130 of the anode chamber 100 is within the range of −50 mm to +50 mm. If the bottom end of the circulation channel 500 is too close to the distribution pipe, the diluted-brine flowing from the channel to the anode chamber will encounter too much resistance, which obstructs the gas-liquid flow around the distribution pipe. If the bottom end of the circulation channel 500 is too far away from the distribution pipe, the electrolyte at the bottom of the anode chamber will not be able to circulate smoothly, thereby causing larger concentration difference.

Preferably, as one embodiment, the width of the circulation channel 500 is larger than 3 mm.

Figure 3:
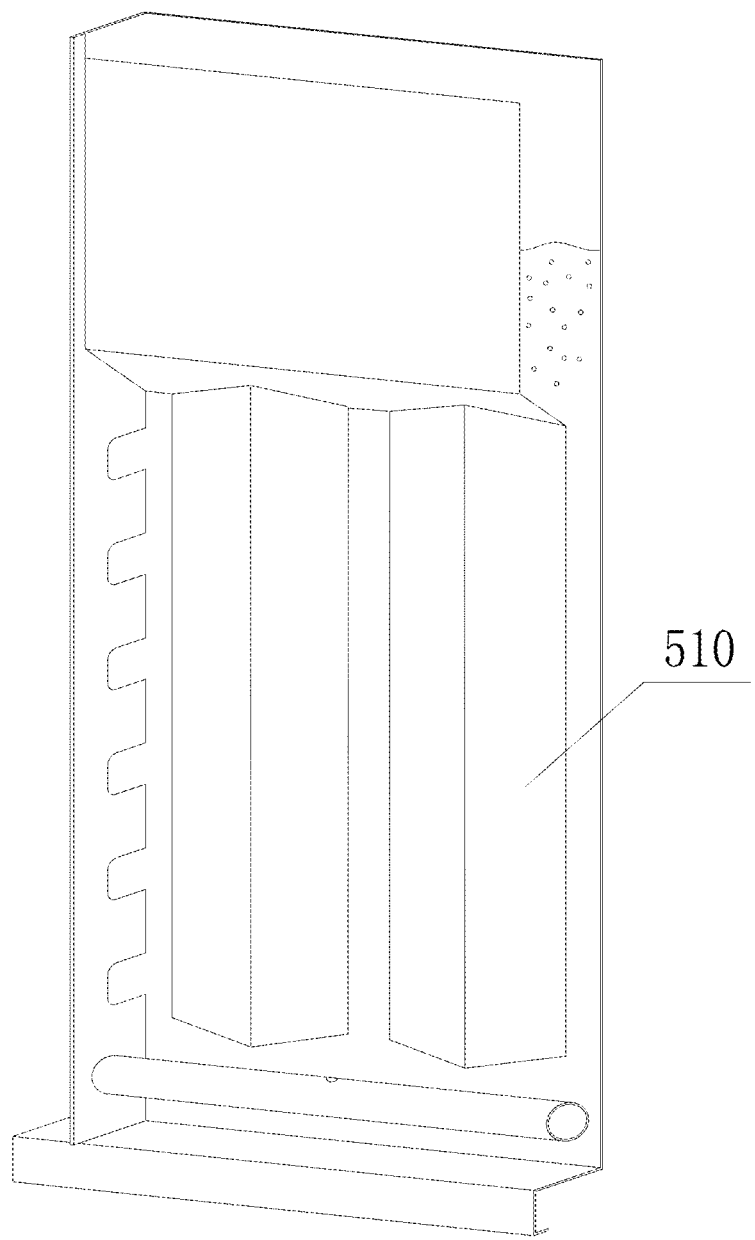
FIG. 3 is an overall schematic view of the circulation plates in FIG. 1 according to one embodiment.

Preferably, as one embodiment, the circulation channel 500 includes the circulation plate 510 and the base plate of the electrolysis chamber. As shown in FIG. 1, the circulation channel 500 in the anode chamber 100 includes the circulation plate 510 and the anode base plate 120 in the anode chamber 100, wherein the circulation plate 500 is in parallel with the anode base plate 120. The circulation channel 500' in the cathode chamber 200 includes the circulation plate 510' in the cathode chamber and the cathode base plate 220 in the cathode chamber 200. In this embodiment, the circulation plate 510 is fixed to the bottom wall of the gas-liquid separation chamber 300. Preferably, the circulation plate 510 may have the structure of the flat plate shown in FIG. 1, or may have the structure of the special-shaped plate shown in FIG. 3. When the circulation plate has the structure of the special-shaped plate, not only the vertical circulation of the electrolytic cell, but also the circulation in the depth direction of the electrolytic cell can be facilitated. The cross-section of the special-shaped plate in this embodiment may be in the shape of a triangle or a rectangle.

Figure 4:
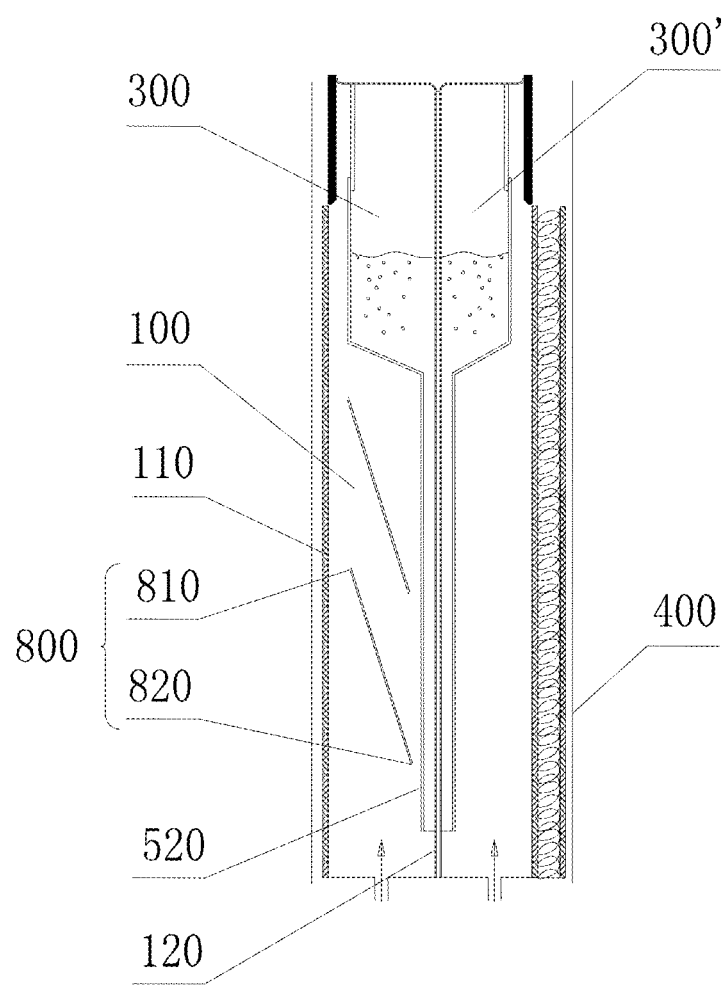
FIG. 4 is an overall schematic view of the circulation channel in FIG. 1 according to another embodiment.
Figure 5:
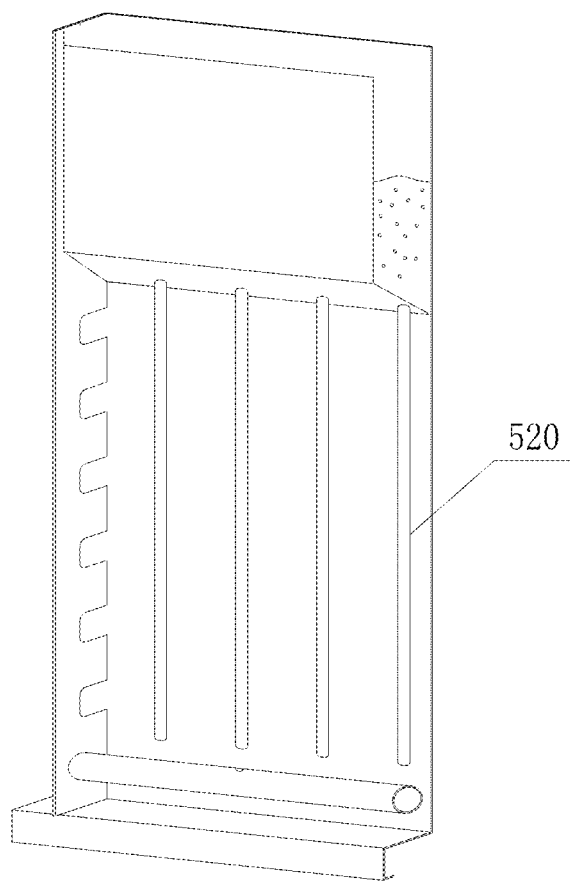
FIG. 5 is a stereoscopic schematic view of the circulation channel shown in FIG. 4.

As another embodiment, the circulation channels 500 may be embodied as circulating tubes 520. Preferably, a plurality of circulating tubes 520 are arranged uniformly between two adjacent reinforcing plates. As shown in FIGS. 4 and 5, more than two circulating tubes 520 are provided, wherein at least one circulating tube 520 communicates with the gas-liquid separation chamber 300. The diameter and the number of the circulating tubes are determined through calculation according to the inner circulation volume of the electrolyte with different current densities. The larger the diameter of the circulating tube 520 is, the smaller the number of circulating tubes 520 needed for achieving the same circulation volume of liquid. Too large number of the circulating tubes 520 may cause the increase of installation cost and manufacture cost. Too small number of the circulating tubes 520 may require the increase of the cross-section area of a single circulation channel in order to facilitate the circulation. And if the cross-section area of the circulation channel is too large, greater resistance will be generated against the rising gas-liquid mixture in the electrode chamber. Preferably, in this embodiment, the number of the circulating tubes 520 in a basic unit between adjacent reinforcing plates is from 1 to 10. On the other hand, too large cross-section area of the circulating tube is not conducive to the gas-liquid mixture rising from the electrolysis chamber to the gas-liquid separation chamber. And too small cross-section area of the circulating tube will require the increase of the number of the circulating tubes. Therefore, in this embodiment, the cross-section area of the circulating tube is preferably greater than 12 mm$^2$.

The shape of the cross-section of the circulating tube 520 is not limited to a circle, but may be a square, a triangle, or other irregular shapes, only if the liquid within the gas-liquid separation chamber can be introduced to the bottom of the electrolysis chamber with relatively small resistance.

The circulating tubes may communicate with the gas-liquid separation chamber or not communicate with the gas-liquid separation chamber. The circulating tubes not communicating with the gas-liquid separation chamber may be arranged vertically and attached closely to the base plate of the electrolysis chamber (the anode base plate 120 or the cathode base plate 220). The circulating tubes not communicating with the gas-liquid separation chamber can introduce the liquid (diluted-brine) within the electrolysis chamber (said liquid is present outside the bottom wall 304 of the gas-liquid separation chamber 300) to the bottom of the anode chamber or the cathode chamber. It should be noted that the circulation plates 510 not communicating with the gas-liquid separation chamber and the circulating tubes not communicating with the gas-liquid separation chamber may be provided simultaneously.

Figure 6:
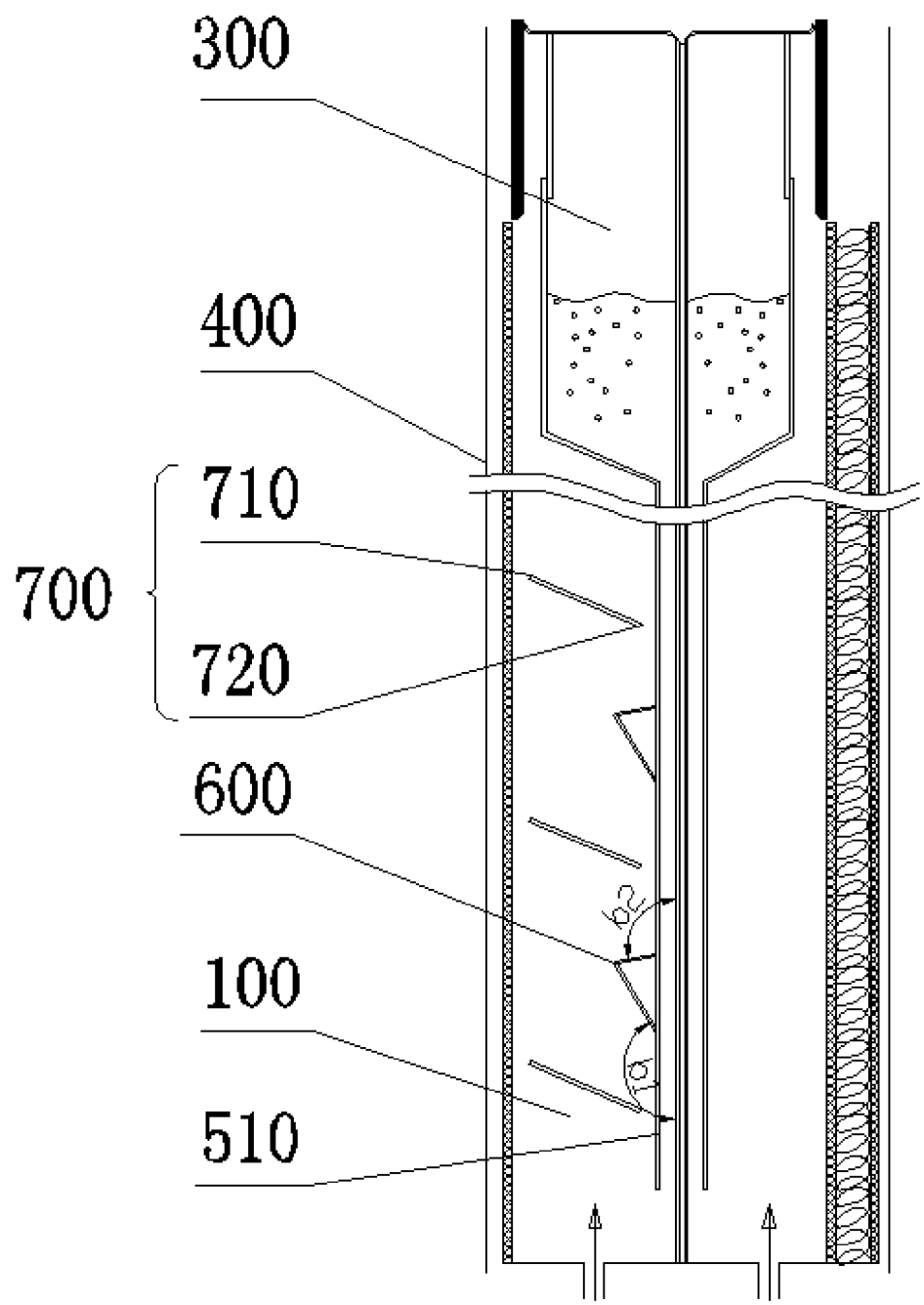
FIG. 6 is an overall schematic view of the circulation modules of the ion exchange membrane electrolytic cell according to one embodiment of the present invention.
Figure 7:
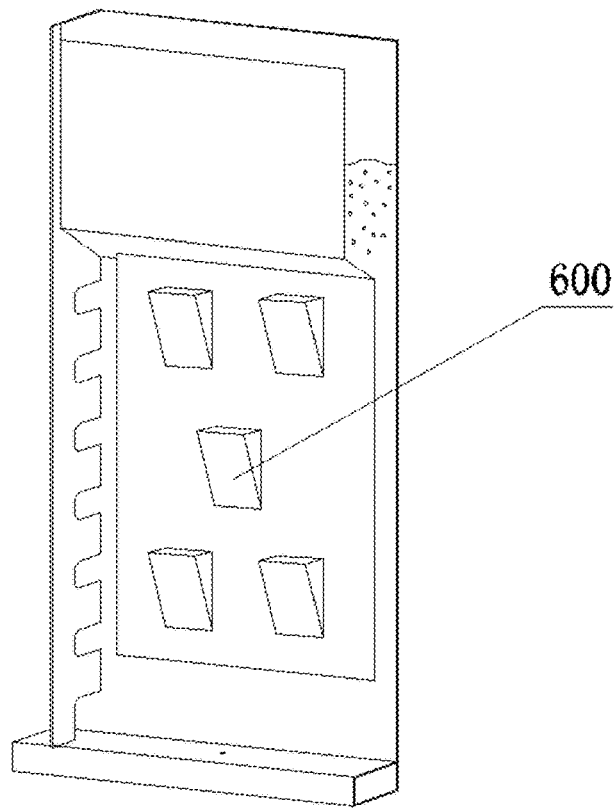
FIG. 7 is a stereoscopic schematic view of the circulating modules shown in FIG. 5.
Figure 8:
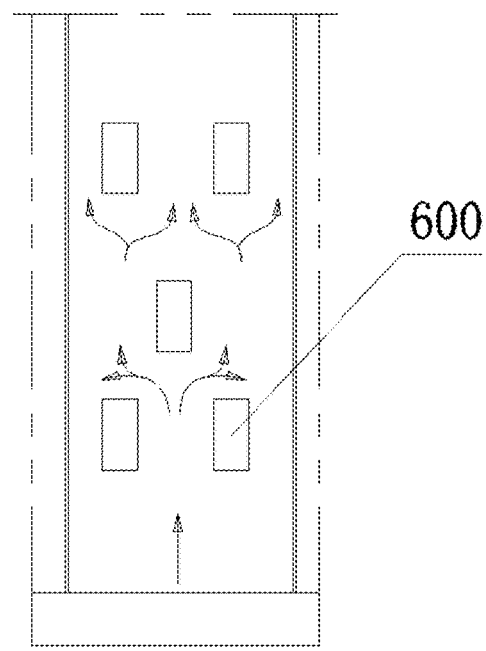
FIG. 8 is a schematic view illustrating the fluid flow after the circulation modules are added.

As another embodiment of the ion exchange membrane electrolytic cell of the present invention, as shown in FIGS. 6 to 8, the anode chamber 100 was further provided with circulation modules 600, which are fixed on the circulation plates 510. Taking the anode chamber as an example, as shown in FIG. 8, the disturbing flow of the mixed liquid goes upward around each of the circulation modules 600 such that the concentration gradient of the liquid in the anode chamber is reduced and the gas and the liquid in the electrolysis chamber are mixed more evenly. The circulation module 600 may take any of the shapes shown in FIG. 9. The circulation modules 600 are arranged along the overall vertical direction of the circulation plates or the special-shaped plates. Preferably, the circulation modules 600 are arranged in the form of two isosceles triangles in mirror alignment with a common vertex. Taking the anode chamber as an example, as shown in FIG. 6, angle b1 and angle b2 respectively formed between the anode base plate 120 and the surfaces of each of the circulation modules 600 (said surfaces are not parallel with the anode base plate) are larger than 90°. If any of these angles is smaller than 90°, narrow space will be formed easily inside the angles, and dead space for brine circulation will further be formed, thus bringing adverse effects on local brine circulation. If the angles are equal to or larger than 90°, liquid is involved in circulation so as to be directed along with the fair current; furthermore, such structure is more stable, and is not apt to be deformed by the impact of the gas-liquid flow. The circulation modules 600 of the ion exchange membrane electrolytic cell of the present invention improves the mixed flow of brine in the direction parallel to the membrane surface, so as to make the brine circulate sufficiently and uniformly around the electrode, thereby enabling the brine with higher concentration to be supplied continuously to the surface of the electrode and helping the gas and the diluted-brine produced through electrolysis to diffuse.

As another embodiment of the ion exchange membrane electrolytic cell of the present invention, taking the anode chamber as an example, with reference to FIG. 6, the ion exchange membrane electrolytic cell is further provided with spoilers 700, which are arranged aslant in the anode chamber 100. The spoiler 700 includes a bottom end 720, and a top end 710 which is far away from the circulation plate 510 or the circulating tube 520. The length of the spoiler is equal to or larger than 15 mm, and the distance between the top end of the spoiler and the anode grid is equal to or larger than 5 mm. The distance between the bottom end of the spoiler and the circulation plate 510 forming the circulation channel 500, or the distance between the bottom end of the spoiler and the circulating tube 520 forming the circulation channel 500, is equal to or larger than 5 mm. The width of the spoiler is equal to the width of the anode chamber. The number of the spoilers is equal to or larger than 3, wherein the spoilers are arranged vertically at equal intervals in the electrolytic cell.

The spoilers of the present invention enable the brine in the electrolysis chamber to sufficiently mix with the electrolyte in the direction perpendicular to the membrane surface. If the spoilers are too short, they cannot realize the effect of sufficiently mixing the brine in the depth direction of the electrolysis chamber, i.e., in the direction from the anode base plate to the anode pole. If the spoilers are too long, they will prevent the gas-liquid mixture circulating in the height direction of the electrolytic cell, thereby causing an increase of the pressure within the anode chamber, and further causing higher pressure on the ion exchange membrane and shortening the service life thereof. Therefore, preferably, the length of the spoiler is equal to or larger than 15 mm, and smaller than or equal to 100 mm. During electrolysis, gas is produced on the surface of the electrode, and the gas drives electrolyte around the electrode to flow upwards. Because of the arrangement of the spoilers, the concentration gradient of the brine within the electrode chamber is reduced, which is benefit to the mixture of the brine and the diffusion of the produced gas. With the spoilers provided, the circulation of the electrolyte in the anode chamber is facilitated.

As another embodiment of the ion exchange membrane electrolytic cell of the present invention, with reference to FIG. 4, the anode chamber 100 and/or cathode chamber 200 are provided with circulation plates 800, which are arranged aslant and the bottom ends of which are close to the anode base plate 120 or the cathode base plate 220. The length of the circulation plate 800 is larger than 300 mm. The distance between the top end 810 of the circulation plate 800 and the anode grid 100 is larger than 5 mm. The distance between the bottom end 820 of the circulation plate 800 and the circulation plate 510 forming the circulation channel 500, or the distance between the bottom end 820 of the circulation plate 800 and the circulating tube 520 forming the circulation channel 500, is equal to or larger than 3 mm. The width of the circulation plate 800 is equal to the width of the anode chamber 100. The number of the circulation plates 800 is larger than 1, preferably is 2 to 3. The circulation plates 800 are arranged vertically at equal intervals in the electrolytic cell. The circulation plates 800 are provided to ensure the uniform mixture of the electrolyte in the direction parallel with or vertical to the membrane surface in the electrolysis chamber.

It should be especially noted that the spoilers 700 and the circulation plates 800 in this embodiment may be provided simultaneously. The circulation plates 800 can accelerate the fluid mass transfer in the height direction, and the spoilers 700 can accelerate the fluid mass transfer in the horizontal direction, thereby ensuring that the fluid in the anode chamber or in the cathode chamber can be mixed more evenly and that the concentration difference of the electrolyte wherever in the electrolysis chamber is smaller.

The ion exchange membrane electrolytic cell of the present invention further includes a liquid inflow distribution pipe, the inlet of which is located at the bottom of the anode chamber or the cathode chamber. When the liquid flows in through the distribution pipe, the liquid at the bottom of the electrolytic cell flows into the electrolysis chamber uniformly to be electrolyzed. The cross-section of the distribution pipe is preferably in the shape of a circle, but it is not limited to be a circle, and it may be a rectangle, a triangle or a separate isolated space with an inlet and an outlet. The liquid inflow distribution pipe in the anode chamber may communicate with the circulation channel 500, so that the diluted-brine and the concentrated-brine are mixed sufficiently in the circulation channel 500 before they are distributed outwards from the distribution pipe, as thus the circulation is more evenly, so as to realize the effects of sufficient mixture and sufficient circulation of the diluted-brine and the concentrated-brine within the electrolysis chamber.

The First Embodiment

The schematic view of the ion exchange membrane electrolytic cell of this embodiment is shown in FIG. 6. The ion exchange membrane electrolytic cell includes an anode chamber 100 and a cathode chamber 200, wherein an anode base plate 120 of the anode chamber 100 and a cathode base plate 220 of the cathode chamber 200 are connected in a back-to-back manner. Gas-liquid separation chambers 300 and 300' are partially located in the anode chamber 100 and in the cathode chamber 200 respectively and the length of the gas-liquid separation chambers is equal to the width of the electrolytic cell.

In the anode chamber 100, the height of the side wall 302 of the gas-liquid separation chamber 300 is 65 mm, and the top end of the side wall 302 is higher than the bottom end of the flat plate 301 by 10 mm. The height of the gas-liquid channel formed through perforation at the top end of the side wall 302 of the gas-liquid separation chamber 300 is 7 mm, and the angle between the side wall 302 and the bottom wall 304 of the gas-liquid separation chamber 300 is 100°. The distance between the flat plate 301 and the side wall 302 is 5 mm, and the distance between the side wall 302 and the anode grid 110 is 5 mm.

The distance between the anode base plate 120 and the circulation plate 510 in parallel with the anode base plate 110 is 5 mm. The circulation plate 510 and the gas-liquid separation channel are connected by welding. The distance between the bottom end of the circulation plate 510 and the distribution pipe at the bottom of the anode chamber 100 is 10 mm, and the length of the circulation plate 510 is 980 mm.

Three spoilers 700 are arranged at equal intervals in the anode chamber, and the length of the spoiler is 15 mm. The distance between the top end 710 of the spoiler 700 and the anode grid 110 is 15 mm, and the distance between the bottom end 720 of the spoiler 700 and the circulation plate 510 is 5 mm. The width of the spoiler 700 is equal to the width of the anode chamber 100, and the spoiler 700 is formed with several small plates partitioned by reinforcing ribs. The structure of the spoiler and gas-liquid separation chamber 300' in the cathode chamber 200 is identical to that in the anode chamber 100.

The Second Embodiment

The structure of the gas-liquid separation chamber of this embodiment is the same as that in the first embodiment, and the arrangement of the spoilers 700 in the anode chamber is the same as that in the first embodiment as well.

The circulation channel 500 of this embodiment is embodied as the circulating tubes 520, namely, the five circulating tubes 520 which are arranged at equal intervals on the anode base plate 120. The circulating tubes 520 hermetically communicate with the gas-liquid separation chamber through sealing connections with the bottom wall 304. In this embodiment, the diameter of the circulating tube is 10 mm, and the length of the circulating tube is 1080 mm.

The Third Embodiment

As shown in FIG. 6, the structure of the gas-liquid separation chamber of this embodiment is the same as that in the first embodiment, and the circulation plate 510 in the anode chamber is the same as that in the first embodiment 1 as well.

The circulation plate 510 is further provided with circulation modules 600, which are arranged along the overall vertical direction of the circulation plates, and the circulation modules 600 are arranged in the form of two isosceles triangles in mirror alignment with a common vertex.

Figure 9:
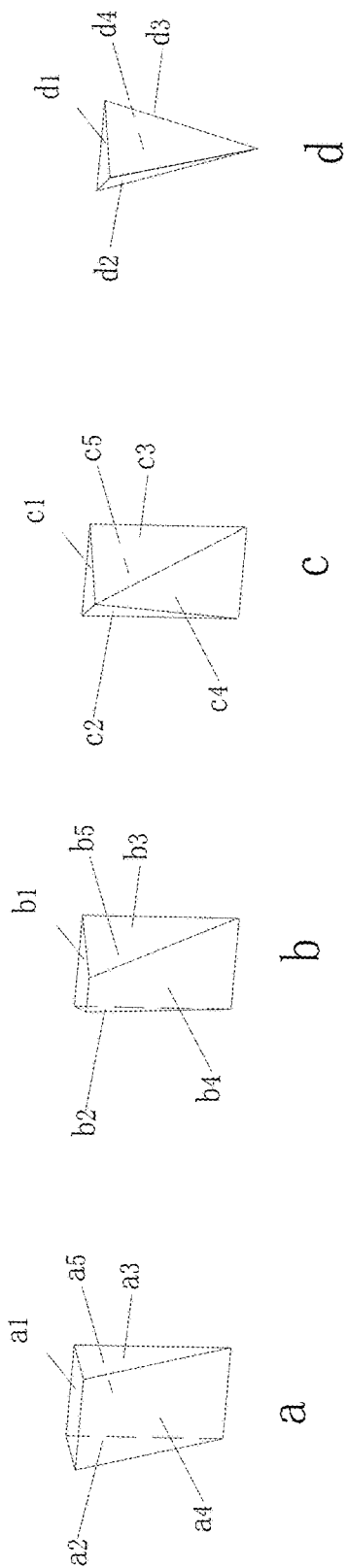
FIG. 9 is a schematic view illustrating different structures of the circulation modules.

The circulation modules 600 are arranged along the overall vertical direction of the circulation plates 510, in the form of two isosceles triangles in mirror alignment with a common vertex, wherein each module of the circulation modules 600 takes the structure of the member a shown in FIG. 9. Wherein, the bottom face a5 has the length of 20 mm and the width of 20 mm, and the side a1 has a perpendicular height of 15 mm relative to the bottom face.

The Fourth Embodiment

The structure of the gas-liquid separation chamber of this embodiment is the same as that in the first embodiment, and the circulation plate 510 in the anode chamber is the same as that in the first embodiment as well. While the arrangement of the circulation modules on the circulation plate is the same as that in the third embodiment.

The circulation modules 600 are arranged along the overall vertical direction of the circulation plates 510, in the form of two isosceles triangles in mirror alignment with a common vertex, wherein each module of the circulation modules 600 takes the structure of the member c shown in FIG. 9. Wherein, the bottom face c5 has the length of 20 mm and the width of 20 mm, and the top face c1 is an isosceles triangle, the height of which is 15 mm.

Performance Test

Five ion exchange membrane electrolytic cell units were produced with Asahi Kasei cation exchange membrane for each of the embodiments 1 to 4, to form four groups of electrolytic cell units. Simultaneously, five electrolytic cell units in the prior art were provided. All of the cell units were put into operation for 15 days of electrolysis under the conditions as follows: the concentration of the secondary brine inflow in the anode chamber is within the range of 300 to 310 g/L; the addition quantity and the concentration of the diluted-alkaline water in the cathode chamber should ensure that the mass concentration of the concentrated-alkaline water discharged from the concentrated-alkaline water outlet of the cathode chamber is equal to or greater than 32%; the electrolysis temperature is 85±2° C.; and the current density is within the range of 40 to 60 A/dm$^2$.

Temperatures at nine points in the anode chamber were detected by inserting the temperature detecting tubes in the anode chamber. Data output from the temperature sensors were recorded, and the differences between the maximum and the minimum detected temperature values were listed in Table 1.

The anolyte at the nine points in the anode chamber was sampled and analyzed. The differences between the maximum and the minimum concentration values were taken as the concentration differences, and all data are shown in Table 1.

TABLE 1

| | | Current Density (A/dm$^2$) | | |
|---|---|---|---|---|
| | | 40 | 50 | 60 |
| Temperature Differences in Anolyte in Anode Chamber (° C.) | Prior Art Electrolytic Cell | 8.5 | 8.9 | 9.5 |
| | Embodiment 1 | 6.6 | 7.4 | 7.8 |
| | Embodiment 2 | 6.3 | 7.4 | 7.7 |
| | Embodiment 3 | 6.4 | 7.2 | 7.8 |
| | Embodiment 4 | 6.4 | 7.3 | 7.9 |
| Concentration Differences in Anolyte in Anode Chamber (N) | Prior Art Electrolytic Cell | 0.90 | 0.94 | 0.98 |
| | Embodiment 1 | 0.67 | 0.73 | 0.77 |
| | Embodiment 2 | 0.66 | 0.70 | 0.74 |
| | Embodiment 3 | 0.68 | 0.72 | 0.75 |
| | Embodiment 4 | 0.67 | 0.73 | 0.75 |

According to the ion exchange membrane electrolytic cell of the present invention, the gas-liquid separation chamber is partially located in the anode chamber and/or the cathode chamber, and the gas-liquid channel is raised to the top of the gas-liquid separation chamber such that the area of the ion exchange membrane and the area of the cathode grid and the anode grid are utilized sufficiently, that is to say, the electrolysis areas of the cathode pole and the anode pole are increased, thereby improving the yield of the ion exchange membrane electrolytic cell.

What described above are several embodiments of the present invention, and they are specific and in details, but not intended to limit the scope of the present invention. It will be understood by those skilled in the prior art that various modifications and improvements can be made without departing from the spirit of the present invention, and these modifications and improvements shall be covered by the present invention. Therefore, the scope of the present invention is defined by the appending claims.

What is claimed is:

1. An ion exchange membrane electrolytic cell, comprising an anode chamber and a cathode chamber, wherein:
    a gas-liquid separation chamber is disposed in the anode chamber and/or the cathode chamber, said gas-liquid separation chamber is partially located inside said anode chamber and/or said cathode chamber; wherein a first portion of said gas-liquid separation chamber, which is configured to accommodate liquid, is disposed inside said anode chamber and/or said cathode chamber, and a second portion of said gas-liquid separation chamber, which is configured to accommodate gas, is disposed outside of said anode chamber and/or said cathode chamber; said gas-liquid separation chamber includes a top wall, a bottom wall, a side wall and a flat plate;
    a gas-liquid channel is formed between said flat plate and said side wall;
    said top wall is disposed outside of said anode chamber and/or said cathode chamber, and said top wall is connected to a base plate of said anode chamber and/or said cathode chamber; and
    said bottom wall is disposed inside said anode chamber and/or said cathode chamber; and
    said bottom wall is connected to a bottom end of said side wall;
    a gas-liquid inlet of said gas-liquid separation chamber is disposed outside of said anode chamber and/or said cathode chamber;
    a top end of said side wall is higher than a bottom end of said flat plate.

2. The ion exchange membrane electrolytic cell according to claim 1, wherein:
    the gas-liquid inlet of said gas-liquid separation chamber is provided with a grid structure, one end of said grid structure is connected to said top wall.

3. The ion exchange membrane electrolytic cell according to claim 1, wherein:
    an angle formed between said bottom wall and said side wall of said gas-liquid separation chamber is larger than 90°.

4. The ion exchange membrane electrolytic cell according to claim 1, wherein:
    the bottom end of said flat plate has a chamfer at a side proximate to the side wall.

5. The ion exchange membrane electrolytic cell according to claim 1, wherein:
    said ion exchange membrane electrolytic cell further includes circulation channels disposed inside said anode chamber and/or the cathode chamber.

6. The ion exchange membrane electrolytic cell according to claim 5, wherein:
    at least one circulation channel communicates with said gas-liquid separation chamber.

7. The ion exchange membrane electrolytic cell according to claim 6, wherein:
    said circulation channel is formed by one or more circulation plates or special-shaped plates, which are provided on a base plate of said anode chamber and/or said cathode chamber, and the base plate of said anode chamber and/or said cathode chamber;
    or said circulation channel is formed by one or more circulating tubes, which are vertically arranged on a base plate of said anode chamber and/or said cathode chamber.

8. The ion exchange membrane electrolytic cell according to claim 6, wherein:
    a distance between said circulation channel and a distribution pipe of said anode chamber and/or said cathode chamber is ranged from −50 mm to +50 mm.

9. The ion exchange membrane electrolytic cell according to claim 7, wherein:
    said circulation plates or special-shaped plates are further provided with circulation modules.

10. The ion exchange membrane electrolytic cell according to claim 1, wherein:
    a spoiler is further provided in said anode chamber and/or said cathode chamber; said spoiler has a bottom end and a top end; a length of said spoiler is equal to or larger than 15 mm, and a distance from the top end of said spoiler to an anode grid or a cathode grid is equal to or larger than 5 mm.

11. The ion exchange membrane electrolytic cell according to claim 1, wherein:
a circulation plate is further provided in said anode chamber and/or said cathode chamber; the circulation plate is arranged aslant, and a bottom end of said circulation plate is close to a base plate of said anode chamber or said cathode chamber.

* * * * *